US012682826B2

(12) United States Patent
Li

(10) Patent No.: US 12,682,826 B2
(45) Date of Patent: Jul. 14, 2026

(54) DISPLAY DEVICE AND ELECTRICAL TERMINAL

(71) Applicant: Guangzhou China Star Optoelectronics Semiconductor Display Technology Co., LTd., Guangzhou (CN)

(72) Inventor: Yuntao Li, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 18/964,419

(22) Filed: Nov. 30, 2024

(65) Prior Publication Data

US 2026/0065839 A1 Mar. 5, 2026

(30) Foreign Application Priority Data

Aug. 29, 2024 (CN) ......................... 202411203888.9

(51) Int. Cl.
*G09G 3/20* (2006.01)

(52) U.S. Cl.
CPC ..... *G09G 3/2096* (2013.01); *G09G 2330/021* (2013.01)

(58) Field of Classification Search
CPC ....................... G09G 3/2096; G09G 2330/021
See application file for complete search history.

(56) References Cited

U.S. PATENT DOCUMENTS

| | | | | |
|---|---|---|---|---|
| 2016/0125791 | A1* | 5/2016 | Park | H02M 3/1584 345/76 |
| 2017/0141578 | A1* | 5/2017 | Im | H02J 7/35 |
| 2019/0172379 | A1* | 6/2019 | Park | H02M 1/32 |
| 2020/0136510 | A1* | 4/2020 | Nam | H02M 3/158 |
| 2021/0158752 | A1* | 5/2021 | Kang | G09G 3/2092 |
| 2022/0255427 | A1* | 8/2022 | Lee | H02M 1/0058 |
| 2024/0322819 | A1* | 9/2024 | Samson | H03K 3/35625 |

* cited by examiner

*Primary Examiner* — Towfiq Elahi
(74) *Attorney, Agent, or Firm* — PV IP PC; Christopher S. Ruprecht; Wei Te Chung

(57) ABSTRACT

The present invention provides a display device and an electrical terminal including a display panel, a driver electrically connected to driving a display panel to display images, a power manager electrically connected to the driver. A first voltage module (included in the power manager) includes a first transistor and a second transistor. The power manager is configured to at least one of the first transistor and the second transistor to switch on according to a value of a first current of the first voltage module transmitted to the driver control. Also, three conversion efficiencies of the first voltage module respectively in conditions of only the first transistor switching on, only the second transistor switching on, and both the first and second transistors switching on are different to reduce power consumption of the display device.

20 Claims, 4 Drawing Sheets

DISPLAY DEVICE AND ELECTRICAL TERMINAL

CROSS REFERENCE TO RELATED APPLICATIONS

This application claims the priority to Chinese Patent Application No. 202411203888.9, filed on Aug. 29, 2024. The entire disclosures of the above application are incorporated herein by reference.

FIELD OF INVENTION

The present invention relates to a field of display technologies, especially to display device manufacturing, particularly to a display device and an electrical terminal.

BACKGROUND OF INVENTION

At present, the output current of the boost circuit in the display device needs to be set according to the light load or heavy load condition of the display images to meet the normal driving requirements of different display screens. However, the conversion efficiency of the conventional boost circuit is relatively low, which is not conducive to the development of low power consumption.

SUMMARY OF INVENTION

An objective of the present invention is to provide a display device and an electrical terminal to improve a conversion efficiency of a boost circuit.

The present invention provides a display device, comprising:

a display panel;

a driver electrically connected to the display panel and configured to drive the display panel to display images;

a power manager electrically connected to the driver and comprising a first voltage module, wherein the first voltage module is configured to transmit a first current to the driver;

wherein the first voltage module comprises a first transistor and a second transistor, the power manager is configured to control at least one of the first transistor and the second transistor to switch on according to a value of the first current, and a first conversion efficiency of the first voltage module in a condition that the first transistor switches on and the second transistor switches off, a second conversion efficiency of the first voltage module in a condition that the second transistor switches on and the first transistor switches off, and a third conversion efficiency of the first voltage module in a condition that the first transistor and the second transistor switch on are different.

In some embodiments, when the value of the first current is a first value, the first transistor switches on and the second transistor switches off, and the first conversion efficiency is greater than one of the second conversion efficiency and the third conversion efficiency;

when the value of the first current is a second value, the second transistor switches on and the first transistor switches off, and the second conversion efficiency is greater than any one of the first conversion efficiency and the third conversion efficiency; and when the value of the first current is a third value, the first transistor and the second transistor switch on, and the third conversion efficiency is greater than one of the first conversion efficiency, the second conversion efficiency.

In some embodiments, a first on-resistance value of the first transistor and a second on-resistance value of the second transistor are unequal.

In some embodiments, the first voltage module comprises:

an inductor, wherein a first end of the inductor is electrically connected to an input terminal of the first voltage module, a second end of the inductor is electrically connected to one of a source electrode and a drain electrode of the first transistor and one of a source electrode and a drain electrode of the second transistor, and the other of the source electrode and the drain electrode of the first transistor and the other of the source electrode and the drain electrode of the second transistor are grounded;

a diode, wherein an anode of the diode is electrically connected to the second end of the inductor, and a cathode of the diode is connected to an output terminal of the first voltage module;

wherein the power manager further comprises a signal generator, the signal generator is configured to transmit a square wave signal to at least one of a gate electrode of the first transistor and the gate electrode of the second transistor.

In some embodiments, the first voltage module further comprises:

a first resistor, a first end of the first resistor is grounded, a second end of the first resistor is electrically connected to the other of the source electrode and the drain electrode of the first transistor;

a second resistor, wherein a first end of the second resistor is grounded, a second end of the second resistor is electrically connected to the other of the source electrode and the drain electrode of the second transistor;

wherein the signal generator is further configured to detect at least one of a voltage of the second end of the first resistor when the square wave signal is transmitted to the gate electrode of the first transistor and a voltage of the second end of the second resistor when the square wave signal is transmitted to the gate electrode of the second transistor to determine the value of the first current, and is configured to further control the square wave signal transmitted to at least one of the gate electrode of the first transistor and the gate electrode of the second transistor according to the value of the first current.

In some embodiments, at least one of the first resistor and the second resistor is a variable resistor.

In some embodiments, the first voltage module further comprises:

a third transistor, wherein one of a source electrode and a drain electrode of the third transistor is electrically connected to the cathode of the diode, the other of the source electrode and the drain electrode of the third transistor is electrically connected to the output terminal of the first voltage module;

the signal generator is further configured to control the third transistor to or not to switch off according to at least one of the voltage of the second end of the first resistor and the voltage of the second end of the second resistor.

In some embodiments, the driver comprises:

a source electrode driver, wherein the source electrode driver is configured to transmit data signals to the display panel according to the first current and a first voltage output by the first voltage module to drive the display panel to display images.

In some embodiments, the power manager further comprises a second voltage module, the second voltage module is configured to supply the display panel with a second voltage, the second voltage is configured to control a plurality of subpixels in the display panel to switch on.

The present invention provides an electrical terminal comprising any one of the above display devices.

The present invention provides a display device and an electrical terminal that set a power manager to be configured to control at least one of the first transistor and the second transistor to switch on according to a value of the first current of the first voltage module transmitted to the driver. Also, three conversion efficiencies of the first voltage module respectively under a condition of the first transistor switching on, a condition of the second transistor switching on, and a condition of both the transistors switching on are different. Reasonably selecting at least one of the first transistor and the second transistor to switch on can achieve a greater conversion efficiency of the first voltage module, thereby reducing a power consumption of the display device.

DESCRIPTION OF DRAWINGS

FIG. 5 is a "power conversion efficiency-current" curve chart of a first voltage module when transistors with different specifications, provided by the embodiment of the present invention, switch on.

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

In the description of the present invention, terms such as "first," "second," etc., are used solely for descriptive purposes and should not be construed as indicating or implying relative importance or specifying the quantity of technical features indicated. Thus, features designated as "first" or "second" may explicitly or implicitly include one or more of the specified features. In addition, it should be noted that the attached drawings only provide a structure closely related to the present application, and omit some details that are not relevant to the application. The purpose is to simplify the attached drawings such that the application features are clear at a glance rather than indicating what shown in the attached drawings is actually the same as an actual device, which is not a limit to the actual device.

"Embodiment" mentioned in the specification means that specific features, structures, or characteristics described in combination with the embodiments can be included in at least one embodiment of the present invention. Terminologies presenting at each location of the specification do not necessarily refer to the same embodiment, and is either not an individual or backup embodiment mutually exclusive to other embodiment. A person of ordinary skill in the art can explicitly or implicitly understand that the embodiment described in the specification can combine other embodiment.

The present invention provides a display device, the display device can comprise but is not limited to the following embodiments and and combinations of the following embodiments.

Figure 1:
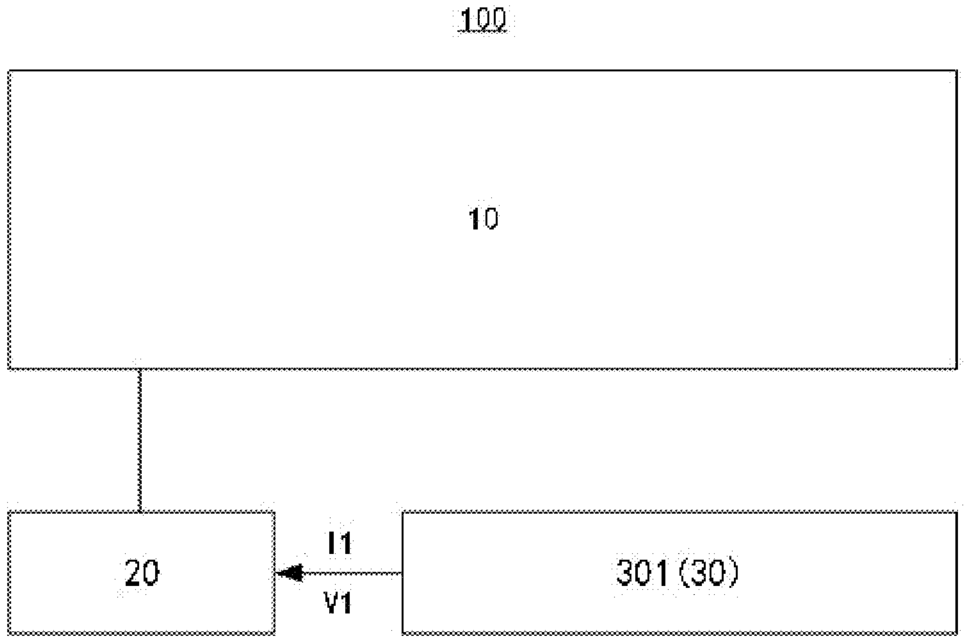
FIG. 1 and FIG. 2 are framework diagrams of a display panel provided by the embodiment of the present invention.
Figure 2:
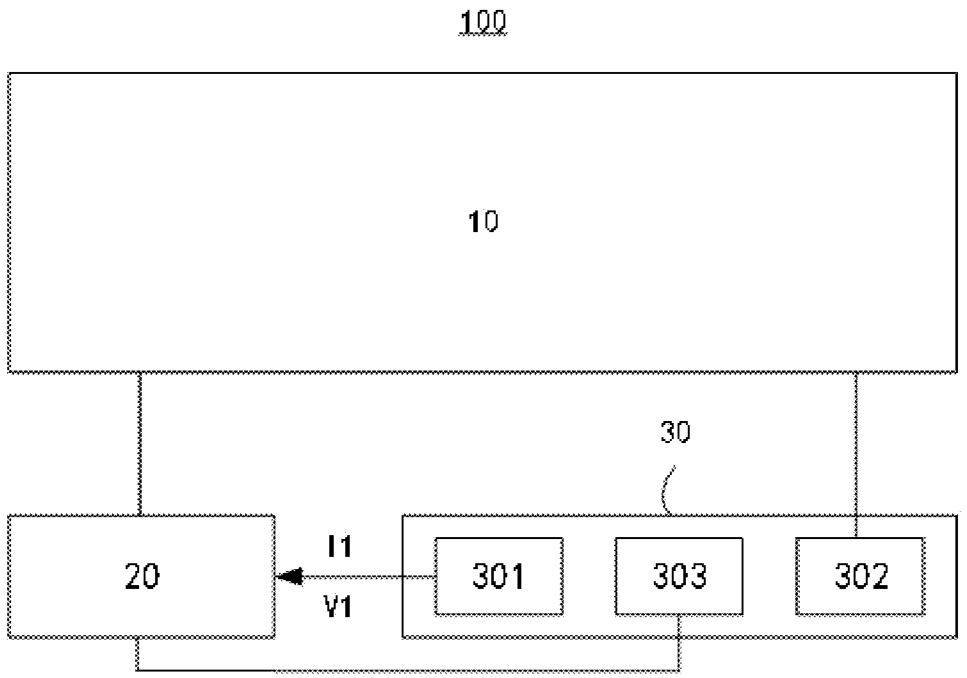
Figure 3:
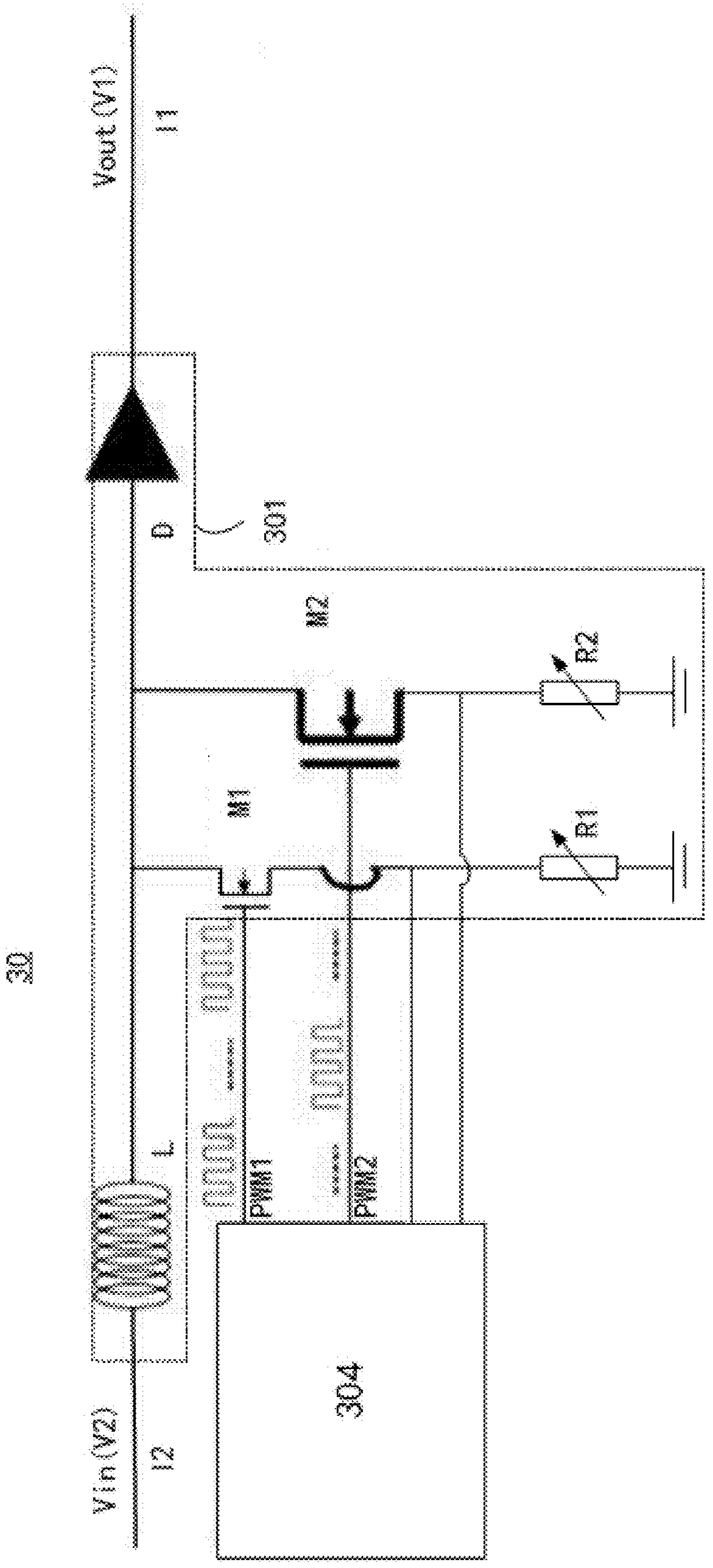
FIG. 3 and FIG. 4 are circuit diagrams of a power manager provided by the embodiment of the present invention.
Figure 4:
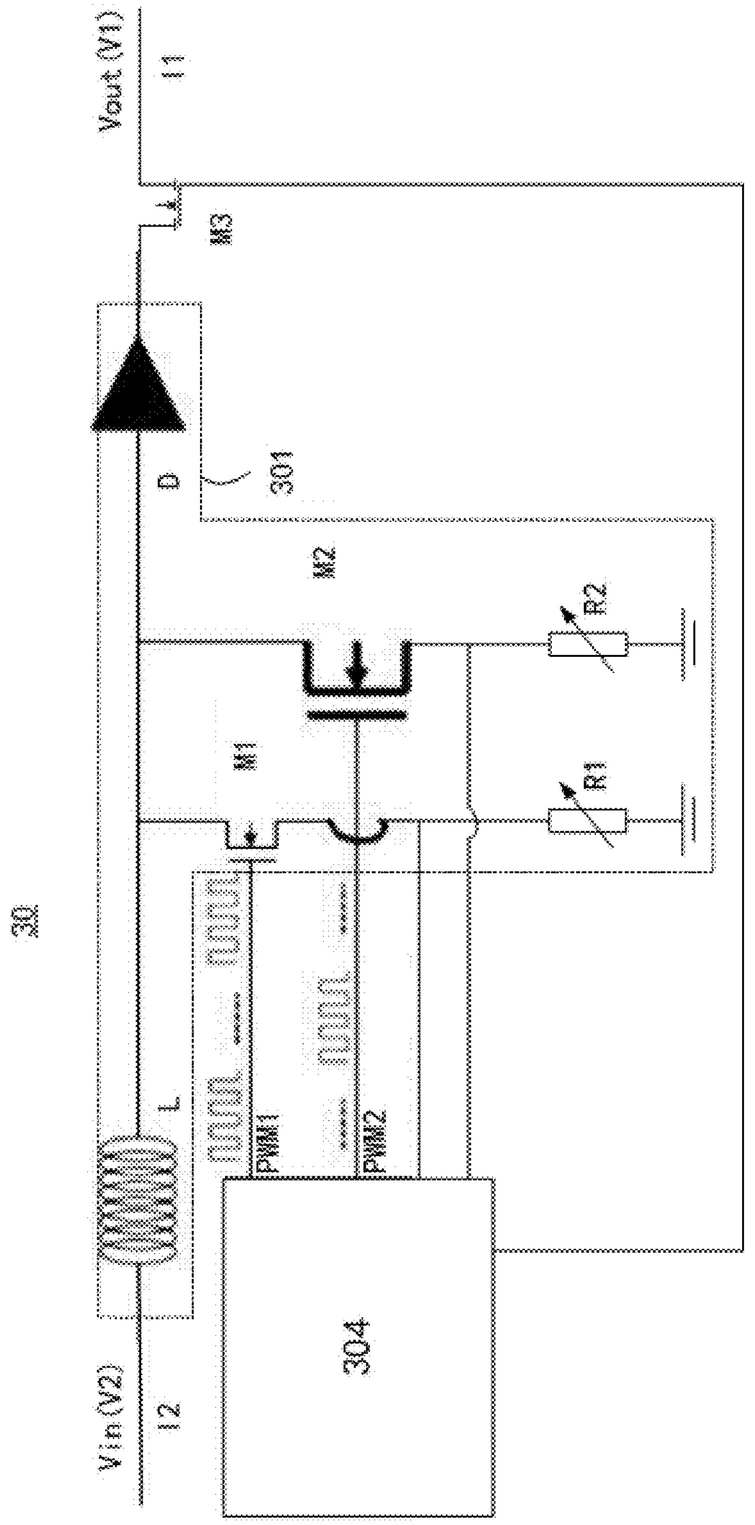
Figure 5:
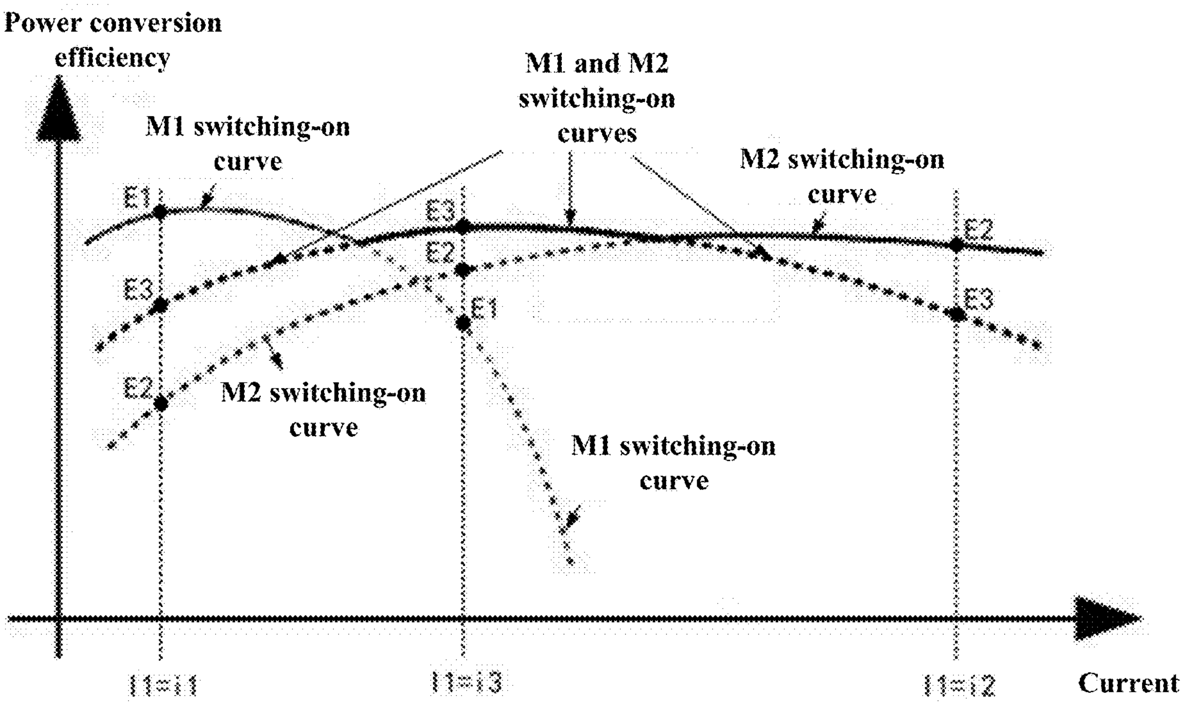

In some embodiments, with reference to FIG. 1 and FIG. 2, a display device 100 comprises: a display panel 10; a driver 20 electrically connected to the display panel 10 and configured to drive the display panel 10 to display images; a power manager 30 electrically connected to the driver 20 and comprising a first voltage module 301, wherein the first voltage module 301 is configured to transmit a first current I1 to the driver 20; wherein with reference to FIG. 3 and FIG. 4, the first voltage module 301 comprises a first transistor M1 and a second transistor M2, the power manager 30 is configured to control at least one of the first transistor M1 and the second transistor M2 to switch on according to a value of the first current I1. With reference to FIG. 5, a first conversion efficiency E1 of the first voltage module 301 when the first transistor M1 switches on and the second transistor M2 switches off, a second conversion efficiency E2 of the first voltage module 301 when the second transistor M2 switches on and the first transistor M1 switches off, and a third conversion efficiency E3 of the first voltage module 301 when both the first transistor M1 and the second transistor M2 switch on are different from one another.

The display panel 10 can be a liquid crystal display panel or a self-luminescence display panel. The driver 20 can comprise a source electrode driver and a timing controller that are electrically connected together. A gate electrode driver can be integrated in the display panel 10 or the driver 20. The first voltage module 301 in the power manager 30 is electrically connected to the source electrode driver to transmit a first voltage V1 and the first current I1 to the source electrode driver. With reference to FIG. 2, the power manager 30 further comprises a second voltage module 302, and the second voltage module 302 is configured to supply the display panel 10 with a corresponding voltage and a corresponding current. The second voltage is configured to drive a pixel circuit in the display panel 10 to work to control a plurality of subpixels in the display panel 10 to switch on. The power manager 30 further comprises a third voltage module 303 electrically connected to the timing controller (included in the driver 20) to transmit a corresponding voltage and a corresponding current to the timing controller, thereby enabling the timing controller to work to generate a control signal applied to the source electrode driver and the gate electrode driver.

In particular, the first voltage V1 in the present embodiment can be but is not limited to be configured to cooperate with with the grayscale value to generate a Gamma reference voltage of the data voltage and can be configured to drive a working voltage of a buffer in the source electrode driver such that the source electrode driver is configured to transmit a data signal to the display panel 10 according to the first current I1 and the first voltage V1 output by the first voltage module 301 to drive the display panel 10 to display images. The first current I1 can be regarded as to relate a driving current of the source electrode driver (included in the driver 20) driving the display panel 19 to display images, ant its value can be comprehended as to relate a grayscale value of a current image. For example, when the current image is a heavy load image (namely, a variation between adjacent two data voltages sequentially transmitted by the same data line is greater), the value of the first current I1 is greater. When the current image is a light load image (namely, a variation between adjacent two data voltages sequentially transmitted by the same data line is smaller), the value of the first current I1 is smaller.

It can be understood according to the above descriptions that with reference to FIG. 3 and FIG. 4, the first voltage module 301 needs to obtain the second current I2 from an ambient environment according to the value of the first current I1 required by the source electrode driver. Furthermore, the first voltage module 301 can also perform voltage conversion, for example when the first voltage module 301 is a boost module, it can convert an input voltage Vin (for example, a second voltage V2 unequal to the first voltage V1) into an output voltage Vout (namely, the above the first voltage V1) with a greater amplitude. It can be understood according to the law of conservation of energy that the input power (namely, V2*I2) of the first voltage module 301 can be equal to a sum of its internal loss power and its output power (namely, V1*I1). "Power conversion efficiency" is defined as a ratio of the above output power and the above input power. Therefore, how to reduce the internal loss power of the first voltage module 301 to increase the output power is crucial to the power consumption of the display device 100.

It can be comprehended that based on transistors required to be disposed in the first voltage module 301 to achieve the above voltage conversion function, and with reference to FIG. 5, the present embodiment, after research, discovers that when transistors of different specifications in the first voltage module 301 work, "power conversion efficiency-current (can be comprehended to be positively correlated with the above the first current I1)" curves of the first voltage module 301 are also different (for example, when only the first transistor M1 switches on, the "power conversion efficiency-current" curve is a "M1 switching-on curve" centrally distributed in a smaller current range, when only the second transistor M2 switches on, the "power conversion efficiency-current" curve is a "M2 switching-on curve" centrally distributed in a greater current range, and when both the first transistor M1 and the second transistor M2 switch on, the "power conversion efficiency-current" curve is a "M1, M2 switching-on curve" centrally distributed in an adequate current range); Therefore, with reference to FIG. 2 and FIG. 3, the first transistor M1 and the second transistor M2 of different specifications are disposed in the present embodiment. Also, under the current the value of the first current I1, the power manager 30 can control at least one of the first transistor M1 and the second transistor M2 to switch according to the value of the first current I1 such that the "power conversion efficiency-current" of the first voltage module 301 be determined according to one of the above three curves to further determined a conversion efficiency (namely, "power conversion efficiency", one of the above first conversion efficiency E1, the second conversion efficiency E2 and third conversion efficiency E3) corresponding to the first current I1 under the curve. Reasonably selecting at least one of the first transistor M1 and the second transistor M2 to switch on can achieve the first voltage module 301 having the greater conversion efficiency, thereby reducing the power consumption of the display device 100.

In particular, with reference to FIG. 3 to FIG. 5, when the value of the first current I1 is a first value i1 (for example, a smaller value), only the first transistor M1 switches on, and the first conversion efficiency E1 of the first voltage module 301 when only the first transistor M1 switches on is greater than the second conversion efficiency E2 when only the second transistor M2 switches on, and greater than any of the third conversion efficiency E3 when both the first transistor M1 and the second transistor M2 switch on. When the value of the first current I1 is a second value i2 (for example, a larger value), only the second transistor M2 switches on, and the second conversion efficiency E2 of the first voltage module 301 when only the second transistor M2 switches on is greater than the first conversion efficiency E1 when only the first transistor M1 switches on, and greater than any of the third conversion efficiency E3 when both the first transistor M1 and the second transistor M2 switch on. When the value of the first current I1 is a third value i3 (for example, a moderate value), both the first transistor M1 and the second transistor M2 switch on, and the third conversion efficiency E3 of the first voltage module 301 when both the first transistor M1 and the second transistor M2 switch on is greater than the first conversion efficiency E1 when only the first transistor M1 switches on, and greater than the second conversion efficiency E2 when only the second transistor M2 switches on.

It can be understood that, in this embodiment, the power manager 30 can, according to whether the first current I1 falls within the first value i1, the second value i2, or the third value i3 (which can be understood as three ranges), determine which of the above three curves is selected as the "power conversion efficiency-current" curve required at the moment. This further allows determining the settings for the switching condition of the first transistor M1 and the second transistor M2 to ensure that the first voltage module 301 has a higher conversion efficiency under the first current I1, thereby reducing the power consumption of the display device 100.

With reference to FIG. 3 to FIG. 5, the first on-resistance value of the first transistor M1 and the second on-resistance value of the second transistor M2 are not equal. It can be understood that, in this embodiment, the first on-resistance value and the second on-resistance value of the two transistors are unequal, meaning that the electrical resistance values of both in the on state are different. Thus, the power consumed by each (which is positively correlated with the above "internal loss power") is also different. Correspondingly, when the input power is the same, the corresponding output powers are also different. Therefore, in this embodiment, the power manager 30 can control at least one of the first transistor M1 and the second transistor M2 to switch on according to the value of the first current I1, thereby controlling the "internal loss power" to reach a smaller value under the first current I1, and thus controlling the first voltage module 301 to have a higher conversion efficiency under the first current I1.

In particular, the sizes of the first transistor M1 and the second transistor M2 can be set to different sizes, such that the first on-resistance value and the second on-resistance value are different. The sizes can include at least one of the corresponding transistor's channel length or channel width. It can be understood that the greater a size of the transistor, the smaller the corresponding on-resistance value; conversely, the smaller the size of the transistor, the greater the corresponding on-resistance value.

In some embodiments, with reference to FIG. 3 and FIG. 4, the first voltage module 301 comprises: an inductor L, wherein a first end of the inductor L is electrically connected to a input terminal of the first voltage module 301, a second end of the inductor L is electrically connected to one of a source electrode and a drain electrode of the first transistor M1 and one of a source electrode and a drain electrode of the second transistor M2, and the other of the source electrode and the drain electrode of the first transistor M1 and the other the source electrode and the drain electrode of the second transistor M2 are grounded; a diode D, wherein an anode of the diode D is electrically connected to the second end of the inductor L, and a cathode of the diode D is connected to an output terminal of the first voltage module 301. The power manager 30 further comprises a signal generator 304, and the signal generator 304 is configured to transmit a square wave signal (including at least one of a first square wave signal PWM1 corresponding to the first transistor M1 and a second square wave signal PWM2 corresponding to the second transistor M2) to at least one of a gate electrode of the first transistor M1 and a gate electrode of the second transistor M2.

In combination with the above description, the present embodiment uses the first voltage module 301 being a boost module as an example for explanation and uses the first transistor M1 and the second transistor M2 being N-type transistors and the inductor L comprising an inductance L0 as an example for explanation. A working process of the first voltage module 301 can sequentially comprise:

- a charging period (at least one of the first square wave signal PWM1 and the second square wave signal PWM2 is at a corresponding high electric potential) controlling at least one of the first transistor M1 and the second transistor M2 to switch on (such that the diode D negatively switches off), wherein the input terminal of the first voltage module 301, the inductor L, transistor, and a corresponding resistor forms a circuit to charge the inductor L, an increase amount of a current of the inductor L is equal to Vin*Ton/L0 in this time length Ton;
- a discharging period (both the first square wave signal PWM1 and the second square wave signal PWM2 are at a corresponding low electric potential) controlling the first transistor M1 and the second transistor M2 to switch off (such that the diode D positively switches on), wherein the input terminal of the first voltage module 301, the inductor L, the diode D, and the output terminal of the first voltage module 301 forms a circuit, the inductor L is discharged, and a decline amount of the current of the inductor L in this time length Toff is equal to (Vin−Vout)*Toff/L0 in this time length Toff.

In combination with the above descriptions, according to an increase amount and a decrease amount of the current of the inductor L that should be equal, Vout=Vin*(Ton+Toff)/Toff can be acquired. Here a duty cycle D0 of the above square wave signal is defined to be equal to Ton/(Ton+Toff), then it can be determined that Vout=Vin/(1−D0). Because the duty cycle D0 is a positive number less than 1, therefore Vout is greater than Vin, thereby implementing the boost.

It can be comprehended that the signal generator 304 of the present embodiment can be electrically connected to the gate electrode of the first transistor M1 and the gate electrode of the second transistor M2 respectively two leads, and by controlling each lead to output the first square wave signal PWM1 or not or output the second square wave signal PWM2 or not, controls a corresponding one of the first transistor M1 or the second transistor M2 to participate in the above charging or discharging process to further control the "internal loss power" of the above working process. Reasonably controlling the output condition of the first square wave signal PWM1 and the second square wave signal PWM2 enables the "internal loss power" to achieve a smaller value under the first current I1 to further control the first voltage module 301 to have a greater conversion efficiency under the first current I1.

In some embodiments, with reference to FIG. 3 and FIG. 4, the first voltage module 301 further comprises: a first resistor R1, wherein a first end of the first resistor R1 is grounded, and a second end of the first resistor R1 is electrically connected to the other of the source electrode and the drain electrode of the first transistor M1; a second resistor R2, wherein a first end of the second resistor R2 is grounded, a second end of the second resistor R2 is electrically connected to the other the source electrode and the drain electrode of the second transistor M2; wherein the signal generator 304 is further configured to detect at least one of a voltage of the second end of the first resistor R1 when the square wave signal (for example, the first square wave signal PWM1) is transmitted to the gate electrode of the first transistor M1 and a voltage of the second end of the second resistor R2 when the square wave signal (for example, the second square wave signal PWM2) is transmitted to the gate electrode of the second transistor M2 to determine the value of the first current I1, and is configured to further control the square wave signal transmitted to at least one of the gate electrode of the first transistor M1 and the gate electrode of the second transistor M2 according to the value of the first current I1.

In combination with the above descriptions, since output power equals the product of input power and power conversion efficiency E, i.e., V2×I2E=V1×I1, and V1=V2/(1−D0), therefore I1=I2×(1−D0)×E, where according to the current transistor's conduction state, the corresponding "power conversion efficiency-current" curve can be determined. This also means the corresponding relationship between power conversion efficiency E and the first current I1 can be determined, so the value of the first current I1 can be determined by detecting the value of the second current I2. In combination with the above working process, it can be determined that the second current I2 can be substantially equal to about an average current of the inductor L in a charging period or a discharging period.

In particular, because the first transistor M1 is connected to the first resistor R1 in series and the second transistor M2 is connected to the second resistor R2 in series, the present embodiment, after booting and before determine how to control a switching condition of the transistor, can at least control the first square wave signal PWM1 to be applied to the first transistor M1 such that during alternate switching-on and switching-off of the first transistor M1, the signal generator 304 detecting the voltage of the second end of the first resistor R1 in combination with the resistance value of the first resistor R1 can determine a corresponding value of the first current I1 at this time. Similarly, it can at least control the second square wave signal PWM2 to be applied to the second transistor M2 such that during alternate switching-on and switching-off of the second transistor M2, the signal generator 304 detecting the voltage of the second end of the second resistor R2 in combination with the resistance value of the second resistor R2 can determine a corresponding value of the first current I1 at this time.

Furthermore, with reference to FIG. 3 to 5, the present embodiment, after determining a corresponding value of the first current I1 under the above different conditions, can determine the curve in which the first current I1 can have a greater power conversion efficiency according to the current range in which the above three curves centrally distributed, and can further control the switching condition of the current the first transistor M1 and the second transistor M2 according to a switching condition of the first transistor M1 and the second transistor M2 actually corresponding to the curve to further achieve the first voltage module 301 having a greater conversion efficiency under the first current I1, thereby reducing the power consumption of the display device 100.

In some embodiments, with reference to FIGS. 3 and 4, at least one of the first resistor R1, the second resistor R2 is a variable resistor. In particular, before the display device 100 leaves the factory, it is possible to define the threshold for the output current range of the first voltage module 301 corresponding to both the heavy load image and light load image. When the first transistor M1 switches on, the signal generator 304 can calculate the current flowing through the first resistor R1 by detecting a partial voltage of it, thus obtaining the output current of the first voltage module 301 at this time. Similarly, when the second transistor M2 switches on, the output current of the first voltage module 301 at that time can also be obtained.

Furthermore, when the output currents under both conditions mentioned above are less than the "threshold", the light load image is fulfilled. At this time, only the first transistor M1, corresponding to the curve (namely, the M1 switching-on curve) centrally distributed around the first value i1, switches on, and the resistance value of the first resistor R1 in series with it is adjusted until the output current of the first voltage module 301 at this time can approach or even equal the current corresponding to the peak of the M1 switching-on curve. Similarly, if the output currents under the two conditions mentioned above are both greater than the "threshold", it corresponds to the heavy load image being fulfilled. In this case, only the second transistor M2, corresponding to the curve (namely, the M2 switching-on curve) centrally distributed around the second value i2, switches on, and the resistance value of the second resistor R2 in series with it is adjusted until the output current of the first voltage module 301 at this time can approach or even equal the current corresponding to the peak of the M2 switching-on curve.

Therefore, the present embodiment, by setting at least one of the first resistor R1 and the second resistor R as a variable resistor, can adjust the resistance value before leaving the factory such that when the first voltage module 301 after leaving the factory is about to obtain an output current of at least one of the light load image and the heavy load image (determined by the current input current), a resistance value of at least one of the current first resistor R1 and the current second resistor R2 can be fulfilled to enable the first voltage module 301 to have a greater conversion efficiency, thereby saving the power consumption of the display device 100.

In some embodiments, with reference to FIG. 4, a difference from the embodiment of FIG. 3 is that the first voltage module 301 further comprises: a third transistor M3, wherein one of a source electrode and a drain electrode of the third transistor M3 is electrically connected to a cathode of the diode D, and the other of the source electrode and the drain electrode of the third transistor M3 is electrically connected to the output terminal of the first voltage module 301. The signal generator 304 is further configured to control the third transistor M3 to or not to switch off according to at least one of a voltage of the second end of the first resistor R1 and a voltage of the second end of the second resistor R2.

It can be comprehended that the present embodiment connects the third transistor M3 in series between the diode D and the output terminal of the first voltage module 301, and the third transistor M3 can be controlled by the signal generator 304 to switch on and off. In particular, the signal generator 304 can calculate a value of a current output current (namely, the first current I1) of the first voltage module 301 according to detect at least one of the current voltage of the second end of the first resistor R1 and the current voltage of the second end of the second resistor R2. When the value of the first current I1 is abnormal, the signal generator 304 can control the third transistor M3 to switch off prevent continuously transmitting the current first current I1 to the driver 20. When the value of the first current I1 is normal, the signal generator 304 can control the third transistor M3 to switch on to continue to transmit the current first current I1 to the driver 20.

The present invention also provides an electrical terminal, the electrical terminal can comprise but is not limited to any one of the above display devices.

The display device and the electrical terminal provided by the embodiment of the present invention are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments or equivalently replace some of the technical features. These modifications or replacements do not make the essence of the technical solutions depart from a range of the technical solutions of the embodiments of the present application.

The invention claimed is:

1. A display device, comprising:

a display panel;

a driver electrically connected to the display panel and configured to drive the display panel to display images;

a power manager electrically connected to the driver and comprising a first voltage module, wherein the first voltage module is configured to transmit a first current to the driver;

wherein the first voltage module comprises a first transistor and a second transistor, the power manager is configured to control at least one of the first transistor and the second transistor to switch on according to a value of the first current, a first conversion efficiency of the first voltage module is in a condition that the first transistor switches on and the second transistor switches off, a second conversion efficiency of the first voltage module is in a condition that the second transistor switches on and the first transistor switches off, and a third conversion efficiency of the first voltage module is in a condition that the first transistor and the second transistor switch on, and the first conversion efficiency, the second conversion efficiency, and the third conversion efficiency are different from each other.

2. The display device according to claim 1, wherein when the value of the first current is a first value, the first transistor switches on and the second transistor switches off, and the first conversion efficiency is greater than one of the second conversion efficiency and the third conversion efficiency;

when the value of the first current is a second value, the second transistor switches on and the first transistor switches off, and the second conversion efficiency is greater than any one of the first conversion efficiency and the third conversion efficiency; and when the value of the first current is a third value, the first transistor and the second transistor switch on, and the third conversion efficiency is greater than one of the first conversion efficiency and the second conversion efficiency.

3. The display device according to claim 1, wherein a first on-resistance value of the first transistor and a second on-resistance value of the second transistor are unequal.

4. The display device according to claim 1, wherein the first voltage module comprises:

an inductor, wherein a first end of the inductor is electrically connected to an input terminal of the first voltage module, a second end of the inductor is electrically connected to one of a source electrode and a drain electrode of the first transistor and one of a source electrode and a drain electrode of the second transistor, and the other of the source electrode and the drain electrode of the first transistor and the other of the source electrode and the drain electrode of the second transistor are grounded;

a diode, wherein an anode of the diode is electrically connected to the second end of the inductor, and a cathode of the diode is connected to an output terminal of the first voltage module;

wherein the power manager further comprises a signal generator, the signal generator is configured to transmit a square wave signal to at least one of a gate electrode of the first transistor and the gate electrode of the second transistor.

5. The display device according to claim 4, wherein the first voltage module further comprises:

a first resistor, a first end of the first resistor is grounded, a second end of the first resistor is electrically connected to the other of the source electrode and the drain electrode of the first transistor;

a second resistor, wherein a first end of the second resistor is grounded, a second end of the second resistor is electrically connected to the other of the source electrode and the drain electrode of the second transistor;

wherein the signal generator is further configured to detect at least one of a voltage of the second end of the first resistor when the square wave signal is transmitted to the gate electrode of the first transistor and a voltage of the second end of the second resistor when the square wave signal is transmitted to the gate electrode of the second transistor to determine the value of the first current, and is configured to further control the square wave signal transmitted to at least one of the gate electrode of the first transistor and the gate electrode of the second transistor according to the value of the first current.

6. The display device according to claim 5, wherein at least one of the first resistor and the second resistor is a variable resistor.

7. The display device according to claim 5, wherein the first voltage module further comprises:

a third transistor, wherein one of a source electrode and a drain electrode of the third transistor is electrically connected to the cathode of the diode, the other of the source electrode and the drain electrode of the third transistor is electrically connected to the output terminal of the first voltage module;

the signal generator is further configured to control the third transistor to or not to switch off according to at least one of the voltage of the second end of the first resistor and the voltage of the second end of the second resistor.

8. The display device according to claim 1, wherein the driver comprises:

a source electrode driver, wherein the source electrode driver is configured to transmit data signals to the display panel according to the first current and a first voltage output by the first voltage module to drive the display panel to display images.

9. The display device according to claim 1, wherein the power manager further comprises a second voltage module, the second voltage module is configured to supply the display panel with a second voltage, the second voltage is configured to control a plurality of subpixels in the display panel to switch on.

10. A display device, comprising:

a display panel;

a driver electrically connected to the display panel and configured to drive the display panel to display images;

a power manager electrically connected to the driver and comprising a first voltage module, wherein the first voltage module is configured to transmit a first current to the driver;

wherein the first voltage module comprises a first transistor and a second transistor, the power manager is configured to control at least one of the first transistor and the second transistor to switch on according to a value of the first current, a first conversion efficiency of the first voltage module is in a condition that the first transistor switches on and the second transistor switches off, a second conversion efficiency of the first voltage module is in a condition that the second transistor switches on and the first transistor switches off, and a third conversion efficiency of the first voltage module is in a condition that the first transistor and the second transistor switch on, and the first conversion efficiency, the second conversion efficiency, and the third conversion efficiency are different from each other;

wherein when the value of the first current is a first value, the first transistor switches on and the second transistor switches off, and the first conversion efficiency is greater than one of the second conversion efficiency and the third conversion efficiency;

wherein when the value of the first current is a second value, the second transistor switches on and the first transistor switches off, and the second conversion efficiency is greater than any one of the first conversion efficiency and the third conversion efficiency;

wherein when the value of the first current is a third value, the first transistor and the second transistor switch on, and the third conversion efficiency is greater than one of the first conversion efficiency and the second conversion efficiency;

wherein the first voltage module comprises:

an inductor, wherein a first end of the inductor is electrically connected to an input terminal of the first voltage module, a second end of the inductor is electrically connected to one of a source electrode and a drain electrode of the first transistor and one of a source electrode and a drain electrode of the second transistor, and the other of the source electrode and the drain electrode of the first transistor and the other of the source electrode and the drain electrode of the second transistor are grounded;

a diode, wherein an anode of the diode is electrically connected to the second end of the inductor, and a cathode of the diode is connected to an output terminal of the first voltage module;

wherein the power manager further comprises a signal generator, the signal generator is configured to transmit a square wave signal to at least one of a gate electrode of the first transistor and the gate electrode of the second transistor.

11. The display device according to claim 10, wherein a first on-resistance value of the first transistor and a second on-resistance value of the second transistor are unequal.

12. The display device according to claim 10, wherein the first voltage module further comprises:

a first resistor, a first end of the first resistor is grounded, a second end of the first resistor is electrically connected to the other of the source electrode and the drain electrode of the first transistor;

a second resistor, wherein a first end of the second resistor is grounded, a second end of the second resistor is electrically connected to the other of the source electrode and the drain electrode of the second transistor;

wherein the signal generator is further configured to detect at least one of a voltage of the second end of the first resistor when the square wave signal is transmitted to the gate electrode of the first transistor and a voltage of the second end of the second resistor when the square wave signal is transmitted to the gate electrode of the second transistor to determine the value of the first current, and is configured to further control the square wave signal transmitted to at least one of the gate electrode of the first transistor and the gate electrode of the second transistor according to the value of the first current.

13. The display device according to claim 12, wherein at least one of the first resistor and the second resistor is a variable resistor.

14. The display device according to claim 12, wherein the first voltage module further comprises:

a third transistor, wherein one of a source electrode and a drain electrode of the third transistor is electrically connected to the cathode of the diode, the other of the source electrode and the drain electrode of the third transistor is electrically connected to the output terminal of the first voltage module;

the signal generator is further configured to control the third transistor to or not to switch off according to at least one of the voltage of the second end of the first resistor and the voltage of the second end of the second resistor.

15. The display device according to claim 10, wherein the driver comprises:

a source electrode driver, wherein the source electrode driver is configured to transmit data signals to the display panel according to the first current and a first voltage output by the first voltage module to drive the display panel to display images.

16. The display device according to claim 10, wherein the power manager further comprises a second voltage module, the second voltage module is configured to supply the display panel with a second voltage, the second voltage is configured to control a plurality of subpixels in the display panel to switch on.

17. An electrical terminal, comprising a display device, wherein the display device comprises:

a display panel;

a driver electrically connected to the display panel and configured to drive the display panel to display images;

a power manager electrically connected to the driver and comprising a first voltage module, wherein the first voltage module is configured to transmit a first current to the driver;

wherein the first voltage module comprises a first transistor and a second transistor, the power manager is configured to control at least one of the first transistor and the second transistor to switch on according to a value of the first current, a first conversion efficiency of the first voltage module is in a condition that the first transistor switches on and the second transistor switches off, a second conversion efficiency of the first voltage module is in a condition that the second transistor switches on and the first transistor switches off, and a third conversion efficiency of the first voltage module is in a condition that the first transistor and the second transistor switch on, and the first conversion efficiency, the second conversion efficiency, and the third conversion efficiency are different from each other.

18. The electrical terminal according to claim 17, wherein when the value of the first current is a first value, the first transistor switches on and the second transistor switches off, and the first conversion efficiency is greater than one of the second conversion efficiency and the third conversion efficiency;

when the value of the first current is a second value, the second transistor switches on and the first transistor switches off, and the second conversion efficiency is greater than any one of the first conversion efficiency and the third conversion efficiency; and when the value of the first current is a third value, the first transistor and the second transistor switch on, and the third conversion efficiency is greater than one of the first conversion efficiency and the second conversion efficiency.

19. The electrical terminal according to claim 17, wherein a first on-resistance value of the first transistor and a second on-resistance value of the second transistor are unequal.

20. The electrical terminal according to claim 17, wherein the first voltage module comprises:

an inductor, wherein a first end of the inductor is electrically connected to an input terminal of the first voltage module, a second end of the inductor is electrically connected to one of a source electrode and a drain electrode of the first transistor and one of a source electrode and a drain electrode of the second transistor, and the other of the source electrode and the drain electrode of the first transistor and the other of the source electrode and the drain electrode of the second transistor are grounded;

a diode, wherein an anode of the diode is electrically connected to the second end of the inductor, and a cathode of the diode is connected to an output terminal of the first voltage module;

wherein the power manager further comprises a signal generator, the signal generator is configured to transmit a square wave signal to at least one of a gate electrode of the first transistor and the gate electrode of the second transistor.

* * * * *